ALTERNATING VOLTAGE MODULATION SUPPRESSORS

Filed Nov. 10, 1952

INVENTOR.
MIZUO SEKIJIMA
JOHN R. UTTERSTROM
BY
Reynolds, Beach & Christensen
ATTORNEYS 2,773,180
Patented Dec. 4, 1956

2,773,180

ALTERNATING VOLTAGE MODULATION SUPPRESSORS

Mizuo Sekijima and John R. Utterstrom, Seattle, Wash., assignors to Boeing Airplane Company, Seattle, Wash., a corporation of Delaware Application November 10, 1952, Serial No. 319,688

13 Claims. (Cl. 250—27)

This invention relates to electric circuit apparatus for regulating the amplitude of an alternating voltage. The invention is herein illustratively described by reference to the presently preferred form thereof applied in a circuit for energizing one of the two windings of a control synchro for servomechanisms but it will be appreciated by those skilled in the art that modifications and changes in such form may be utilized without departing from the underlying essentials characterizing the invention.

In the particular application for which the invention was originally developed, an objectionable amount of instability or jitter occurred in the servomechanism of an airplane automatic pilot, and it was found that the difficulty could be overcome by eliminating the inherent amplitude fluctuations of the inverter voltage exciting the gyro synchro. A survey of conventional circuits for stabilizing an alternating voltage failed to bring to light any which would be altogether satisfactory for that purpose. Those possibly adaptable to the solution of the problem from the functional standpoint, that is those capable of providing the required high degree of suppressive action, were excessively complex, heavy, bulky, or were not entirely reliable for use in a critical airplane system.

Accordingly a general object of the present invention is to provide novel and improved means which are relatively simple, light in weight, compact, reliable and effective for stabilizing or regulating the amplitude of an alternating voltage.

Another object is to provide an alternating voltage stabilizing circuit which eliminates both transient and long-period fluctuations in such amplitude. Another object is to achieve the desired result with very little energy loss.

In brief terms, the invention contemplates the insertion of a ferromagnetic choke in one of the supply conductors carrying current from the A. C. source to the load, said choke being designed to operate near saturation so as to convert the sine wave of the A. C. source into a sharply peaked distorted waveform. The resulting positive and negative peaks of this wave, of short duration, are clipped or removed as by means of voltage regulating gaseous diodes connected with relatively opposite polarities across the supply conductors in order to conduct when the applied voltage reaches certain amplitude in both senses. It is found that the modified waveform which then results, although distorted, is virtually unaffected by amplitude variations of the supply source. Moreover, the average current rating required of the clipper diodes is relatively small because they are required to conduct only during the short period of the wave peaks. By filtering for removal of harmonics from this wave a substantially pure sine wave of constant amplitude is provided that is substantially unaffected by amplitude variations of the supply source.

Preferably the inductive reactance of the choke at the fundamental supply source frequency is nullified in the supply circuit by the provision of a capacitance resonating in series therewith. In the illustrated case, filtering of the clipped waveform to restore it to a sine wave is accomplished by a parallel resonant L–C circuit, the inductive element of which is provided by a field winding of a load synchro. Preferably for that type of application the capacitance element of this L–C circuit is chosen to be of a value slightly off perfect resonance with such field winding in order to restore the phasing of such sine wave approximately to that of the supply source. In other applications these provisions may be unnecessary or undesirable, or in any case may be replaced by others of an equivalent nature, as the invention has a number of possible variations which may be readily visualized by those skilled in the art.

The foregoing and other features, objects and advantages of the invention will become more fully evident from the following description based upon the accompanying drawings.

Figure 1:
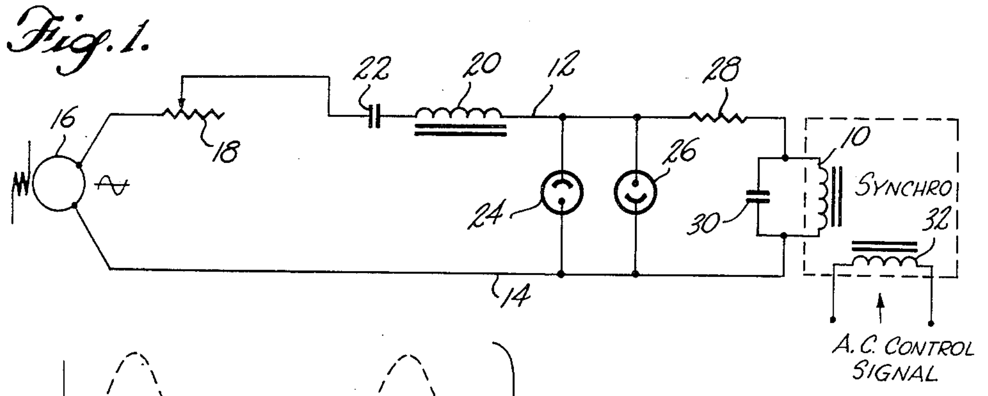
Figure 1 is a schematic diagram of a power supply circuit incorporating the presently preferred form of the invention for the particular application mentioned above.

In Figure 1 the circuit load comprises the field winding 10 of a synchro device. Alternating current is carried through this constantly energized winding over supply conductors 12 and 14 from the supply source 16. A rheostat 18 interposed in conductor 12 enables establishing the excitation current in the winding at a desired value.

Also interposed in supply conductor 12 is the choke 20 having a ferromagnetic flux path and designed to operate near saturation when passing the load current of the synchro winding 10. A condenser 22 connected in series with the choke has a value of capacitance producing the condition of series resonance with the inductance of the choke at the frequency of supply source 16. A pair of gaseous discharge diodes 24 and 26 are connected between conductors 12 and 14 with relatively opposite polarities. These diodes are of the voltage regulator type having an ionizing or breakdown voltage approximately equal to the voltages at which the distorted waveform produced by the choke starts to peak sharply during positive and negative half cycles, respectively. The voltage applied to the load winding 10 becomes the voltage appearing across the diodes 24 and 26, reduced by the IR drop in the series resistor 28 interposed in conductor 12 between the diodes and the load winding.

A condenser 30 connected across the winding 10 resonates with the reactance of such winding and consequently has a filtering effect which converts the distorted waveform produced by the choke 20 and diodes 24, 26 into a substantially pure sine wave of voltage applied to the winding. Resistor 28 isolates the L–C circuit comprising winding 10 and condenser 30 from the relatively low resistance of the shunt-connected diodes 24 and 26, and thereby prevents the diodes from lowering the Q of this filter circuit and impairing its action.

Figure 2:
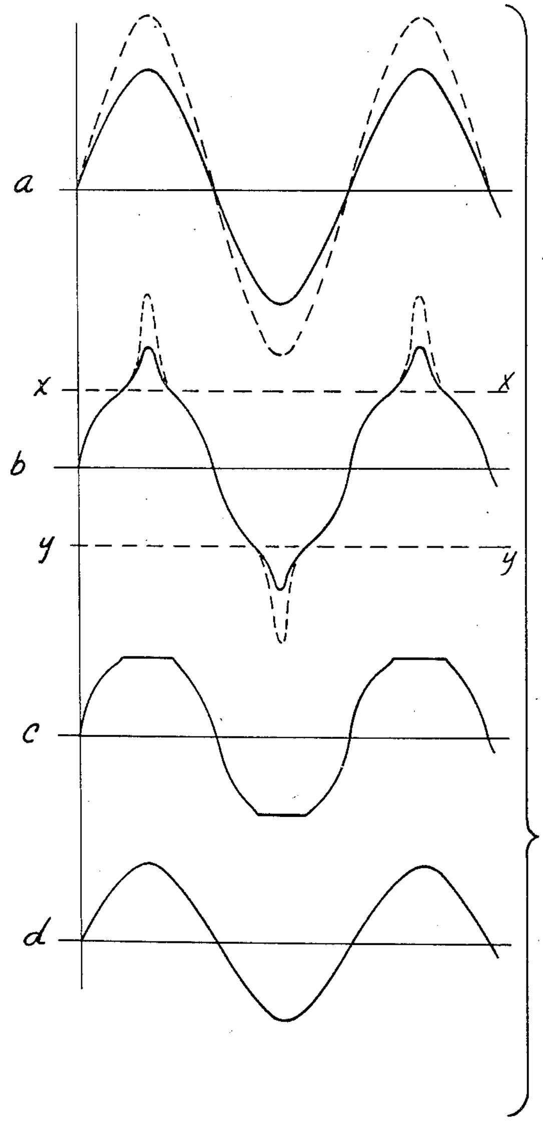
Figure 2 is an approximate graph of waveforms explaining the nature of operation of the circuit.

In Figure 2, waveform *a* represents the sinusoidal voltage wave produced by the supply source 16. Waveform *b* represents the distorted wave which would appear across supply conductors 12 and 14 on the load side of choke 20 without the presence of the diodes 24 and 26 in the circuit. The dotted line variations of waveform *b* illustrate the change in the shape of the wave as a result of a change in the amplitude of waveform *a* represented by the change from the solid line to the dotted line showing in the same figure. Thus it will be noted that a change in the amplitude of waveform *a* has very little effect upon the shape or average amplitude of all portions but the peaks of waveform *b*. Stated in another way, if the positive peaks of wave form *b* are removed above the reference line X—X and the negative peaks of the wave form are removed below the reference line Y—Y, the remaining base portions of the wave included between these lines would remain substantially constant throughout appreciable variations in the amplitude of waveform *a*.

The voltage regulator diodes 24 and 26 act as clipping tubes which operate to accomplish that purpose. With these diodes connected between supply conductors 12 and 14 and having breakdown or ionizing voltages corresponding to the ordinal values of lines X—X and Y—Y, respectively, relative to the base line of waveform *b*, the resulting voltage wave developed between conductors 12 and 14 on the load side of the choke 20 is approximately as represented in waveform *c*. Waveform *c* is considerably distorted from a pure sine wave, of course, but it is a relatively easy matter to filter out the harmonics and produce a pure sine wave from it, represented by waveform *d* in Figure 2. The important factor is that both shape and amplitude of waveform *c*, hence the amplitude of the fundamental frequency component thereof produced by filtering remains substantially constant throughout fluctuations in the amplitude of the original sine wave *a*.

Figure 3:
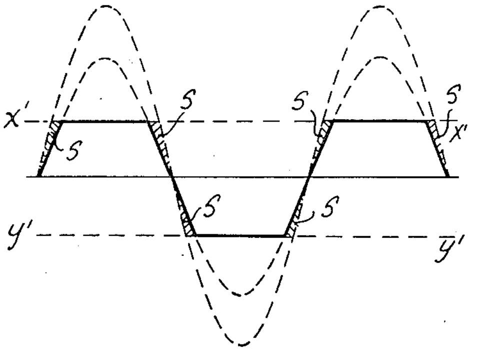
Figure 3 is an approximate graph of waveforms occurring in a different type of stabilizer circuit mentioned for purposes of comparison.

It should be noted that the stabilizing action of the illustrated circuit, including the choke 20 operated near saturation, is much superior to the corresponding action of a circuit utilizing merely the clipper tubes 24 and 26 to stabilize the load voltage. The action of the latter possible type of circuit is illustrated in Figure 3, wherein the lines X′—X′, Y′—Y′ represent the ionizing voltages of clipper tubes corresponding to diodes 24, 26, respectively, in Figure 1, while the solid and dotted line waveforms represent the same sine wave voltage at different amplitudes. The approximately triangular shaded areas S constitute a measure of the effective amplitude variation of the finally filtered sine wave (not shown) accompanying the supply voltage variation. This variation or fluctuation of amplitude is greatly reduced by insertion of the distorting choke 20 in accordance with this invention due to the fact that substantially all of the variation in the shape and amplitude of the wave when amplitude of the source voltage changes occurs in the peaks of the distorted wave.

Another important advantage of the circuit illustrated in Figure 1 over the case of a simple clipper circuit using two diodes to provide the action illustrated in Figure 3 is the lesser problem of filtering the clipped wave in order to convert it back into a pure sine wave for load application purpose. The clipped waveform, substantially trapezoidal in nature, in the case of Figure 3, is far richer in low order harmonics than the more rounded waveform represented as waveform *c* in Figure 2, so that a filter of a lower Q factor will suffice in the latter case.

While there is some slight amount of phase shift in the stabilized sine wave produced by the circuit of Figure 1, due to the distortion effect of the choke 20, it is quite small and for most applications will be negligible. Most of this phase shift may be removed by selecting condenser 30 to be of a size which is slightly different from the size producing true resonance with the inductance of winding 10. The slight phase shift which actually does take place varies somewhat with variations in amplitude of the output voltage from source 16. Accordingly, if correction of this phase shift is desirable for a particular application as aforementioned, condenser 30 is selected to correct for the average amount of phase shift accompanying such variations.

Condenser 22 has two related purposes in the circuit. One is to cancel out or eliminate the phase shift caused by choke 20 at the fundamental wave frequency. This it does by resonating with the choke to produce a net reactance of zero at the fundamental wave frequency. The phase shift discussed above, as being very slight, is that which remains despite the corrective action of condenser 22. A second purpose of providing condenser 22 in series with choke 20 is to minimize the voltage drop which would otherwise occur due to the inductive reactance of choke 20. In the illustration, however, this latter factor is secondary to the factor of phase shift because of the importance of maintaining an established phase relationship between the two windings, namely the excitation winding 10 and the control signal winding 32 of the position synchro. In some applications the condenser 22 may be eliminated.

Furthermore, it will be obvious that other ways of filtering the distorted, stabilized waveform are available. In some instances, the load may be primarily resistive and therefore may not lend itself to the incorporation of a shunt condenser resonant with load inductance, so that a separate filter may be required in order to convert the waveform back into a sine wave. In still other situations it may be unnecessary to convert the distorted waveform back into a sine wave and it may be sufficient for purposes of the particular type of load that the waveform be stabilized. In that case, the load could be connected directly across the two diodes 24, 26. Fundamentally, therefore, the invention resides not only in the preferred form illustrated in Figure 1 but in more fundamental versions and in modified versions thereof as well. This applies not only to the variations discussed above, but also to others including the particular elements for accomplishing the essential functions set forth.

We claim as our invention:

1. In an alternating voltage supply circuit, means comprising a source of alternating voltage of susbtantially sinusoidal form, load means energizable by alternating voltage, circuit means interconnecting said load means and said source means, a wave-distorting ferromagnetic choke series-connected in said circuit means tending to peak the sinusoidal wave of voltage, and clipper means connected across said circuit means on the load side of said choke, eliminating the peaks from the peaked voltage wave developed thereacross by the distorting effect of said choke.

2. The combination defined in claim 1, wherein the clipper means comprise gaseous discharge type voltage-regulating tubes connected across the circuit means with relatively opposite polarities.

3. The combination defined in claim 1, wherein the clipper means comprise gaseous discharge type voltage-regulating tubes connected across the circuit means with relatively opposite polarities, and a condenser connected in the circuit means producing series resonance with the choke.

4. The combination defined in claim 1, wherein the clipper means comprise gaseous discharge type voltage-regulating tubes connected across the circuit means with relatively opposite polarities, a condenser connected in the circuit means producing series resonance with the choke, and filter means associated with the load means converting the clipped voltage wave back into substantially a sine wave applied to such load means.

5. A voltage regulated alternating current circuit comprising, in combination with means for supplying alternating voltage of substantially sinusoidal form, a load branch connected to a pair of voltage supply conductors, a pair of voltage regulating gaseous discharge tubes connected with relatively opposite polarities directly across said branch, and an alternating voltage wave-distorting ferromagnetic choke interposed in series with one of said supply conductors on the side of said tubes remote from said load branch.

6. In combination, a source of alternating voltage of substantially sinusoidal form subject to amplitude variations, load means energized by said source, and alternating voltage stabilizing means connected between said load means and said source, comprising conductive means connected across said load means limiting the attainable amplitude of alternating voltage applied thereto at substantially constant positive and negative peak values materially less than the source voltage amplitude, and voltage wave-peaking ferromagnetic choke means series-connected between said source and said conductive means to carry at least a substantial portion of the load current from said source to said load means, said choke means having a ferromagnetic flux path saturating materially during each half-cycle of load current and thereby varying the impedance of said choke means to produce peaking of said voltage wave.

7. In combination, a source of substantially sinusoidal alternating voltage of predetermined average amplitude subject to amplitude fluctuations, inductive load means energizable by said source at a voltage amplitude appreciably lower than the minimum amplitude of the variable source voltage, a pair of supply conductors interconnecting said load means and said source, a voltage-dropping resistor connected in series with said load means, a capacitance connected across said load means and substantially resonant with the inductance thereof at the source frequency, a pair of gaseous discharge tubes connected between said conductors with relatively opposite polarities, between said resistor and said source and having conducting voltages above said load voltage amplitude and materially below said source voltage minimum amplitude, and a voltage-distorting ferromagnetic choke connected in series with one of said conductors between said source and said discharge tubes and operating near saturation, tending to narrow the peaks of the alternating voltage positive and negative wave portions above and below the respective positive and negative conducting voltages of said gaseous discharge tubes, whereby a substantially constant sinusoidal voltage wave is developed across said load means independent of source voltage amplitude fluctuations.

8. The combination defined in claim 7, and a condenser connected in series with one of the conductors between the source and the discharge tubes substantially resonant at the source frequency with the choke inductance.

9. The combination defined in claim 8, wherein the capacitance connected across the load means resonates to a maximum extent with the inductance thereof at a frequency slightly to that side of the source frequency whereat it substantially corrects for a slight phase shift of the alternating voltage applied to the load means relative to the source voltage.

10. In combination, a source of substantially sinusoidal alternating voltage, load means, voltage stabilizer circuit means applying said source voltage to said load means including an element having inductance carrying current to said load means and having associated means forming a ferromagnetic flux path for said inductance element, said ferromagnetic flux path being materially saturated by flow of load current in said inductance element so as to peak the positive and negative half-cycles of alternating voltage applied by said circuit without materially changing the shape of the base portions of such voltage half-cycles, and voltage limiter means incorporated in said stabilizer circuit removing the positive and negative peaks from said peaked alternating voltage wave while leaving such base portions thereof substantially unaltered before application thereof to said load means.

11. The combination defined in claim 10, wherein the stabilizer circuit means additionally incorporates a capacitance resonant with the inductance element at the fundamental frequency of the source.

12. The combination defined in claim 11, wherein the load means comprises filter means restoring a substantially sinusoidal form to the current flowing through said load means by application of the peaked and clipped alternating voltage wave thereto.

13. The combination defined in claim 10, wherein the load means comprises filter means restoring a substantially sinusoidal form to the current flowing through said load means by application of the peaked and clipped alternating voltage wave thereto.

References Cited in the file of this patent

UNITED STATES PATENTS

| | | |
|---|---|---|
| 1,921,789 | Suits | Aug. 8, 1933 |
| 1,988,294 | Blaich | Jan. 15, 1935 |
| 2,092,093 | Silverman | Sept. 7, 1937 |
| 2,212,648 | Poch | Aug. 27, 1940 |
| 2,368,780 | Roberts | Feb. 6, 1945 |
| 2,416,286 | Busignies | Feb. 25, 1947 |
| 2,501,263 | Cherry et al. | Mar. 21, 1950 |
| 2,552,348 | Shapiro et al. | May 8, 1951 |
| 2,594,016 | Hartwig | Apr. 22, 1952 |